United States Patent
Pajuvirta et al.

[11] Patent Number: 5,970,048
[45] Date of Patent: Oct. 19, 1999

[54] CONTROL OF OVERLOAD SITUATIONS IN FRAME RELAY NETWORK

[75] Inventors: Juha Pajuvirta; Heikki Salovuori, both of Helsinki; Jorma Matkaselkä, Vantaa; Mika Kasslin; Seppo Pyhälammi, both of Helsinki; Mikko Olkkonen, Espoo; Richard Fehlmann; Mikko Laiho, both of Helsinki, all of Finland

[73] Assignee: Nokia Telecommunications Oy, Espoo, Finland

[21] Appl. No.: 08/647,955

[22] PCT Filed: Nov. 29, 1994

[86] PCT No.: PCT/FI94/00535

§ 371 Date: Sep. 24, 1996

§ 102(e) Date: Sep. 24, 1996

[87] PCT Pub. No.: WO95/15637

PCT Pub. Date: Jun. 8, 1995

[30] Foreign Application Priority Data

Nov. 30, 1993 [FI] Finland ..................................... 935365

[51] Int. Cl.⁶ ....................................................... H04J 3/14
[52] U.S. Cl. .......................... 370/230; 370/236; 370/466; 370/412
[58] Field of Search ....................................... 370/229–236, 370/400, 412, 468, 420, 463; 340/825, 825.06, 825.07, 825.02

[56] References Cited

U.S. PATENT DOCUMENTS

| | | | |
|---|---|---|---|
| 5,115,429 | 5/1992 | Hluchyj et al. | 370/231 |
| 5,163,046 | 11/1992 | Hahne et al. | 370/237 |
| 5,436,891 | 7/1995 | Grossman et al. | 370/231 |
| 5,638,359 | 6/1997 | Peltola et al. | 370/229 |
| 5,694,390 | 12/1997 | Yamato et al. | 370/230 |

FOREIGN PATENT DOCUMENTS

| | | |
|---|---|---|
| 0 499 150 | 8/1992 | European Pat. Off. . |
| 0 544 452 | 6/1993 | European Pat. Off. . |
| 0 576 122 | 12/1993 | European Pat. Off. . |
| 03034039 | 2/1991 | Japan . |
| 05103046 | 4/1993 | Japan . |
| 92/07438 | 4/1992 | WIPO . |
| 93/05596 | 3/1993 | WIPO . |
| 93/14605 | 7/1993 | WIPO . |
| PCT/FI93/00537 | 11/1993 | WIPO . |

OTHER PUBLICATIONS

A. Platt & M.J. Morse, Traffic Management in Frame Relay Networks, Computer Networks and ISDN Systems, vol. 23, No. 4 (Jan. 1992), pp. 305–316.

Nobuyuki Tokura, et al., Congestion Avoidance Network, Technical Report of the Institute of Electronics Information and Communication Engineers, IN93–79 Oct. 1, 1993, pp. 49–54.

Kuze, et al., A Study of Congestion Control in Frame Reply Network, Proceedings of the 1993 IEICE Fall Conference (Sep. 1993), vol. 3, B–388.

Zenichi Yashiro, et al., Book for Explanation by Pictures of Frame Relay, Ohm–sha, Aug. 30, 1993, pp. 49–63 and pp. 83–89.

Official Action, dated Jul. 28, 1998, from the Japanese Patent Office in related Application No. 7–515424.

(List continued on next page.)

*Primary Examiner*—Douglas W. Olms
*Assistant Examiner*—Seema S. Rao
*Attorney, Agent, or Firm*—Pillsbury Madison & Sutro LLP

[57] ABSTRACT

A method and a system for congestion management in a frame relay network, which includes a) buffering of data at the input boundary of a subscriber node to virtual-channel-specific buffers, b) transmitting congestion notifications in a backward direction from the network nodes to the subscriber node of the moment, and c) controlling the amount of traffic supplied towards the network from the subscriber node buffer.

7 Claims, 3 Drawing Sheets

OTHER PUBLICATIONS

Jaakonmäki, Leena, "Lähiverkko–opa".

CCITT, The International Telegraph and Telephone Consultative Committee, "Frame Mode Bearer Services", I.233, Geneva, 1992.

CCITT, The International Telegraph and Telephone Consultative Committee, "ISDN Data Link Layer Specification for Frame Mode Bearer Services", Q.922, Geneva, 1992.

CCITT, The International Telegraph and Telephone Consultative Committee, "Congestion Management for the ISDN Frame Relaying Bearer Service", I.370, Geneva, 1991.

"An Overview of Frame Relay Technology", *System Design*, Apr. 1991.

Grimshaw, Michael, "LAN Interconnections Technology" *Feature*, Jun. 1991, pp. 37–46.

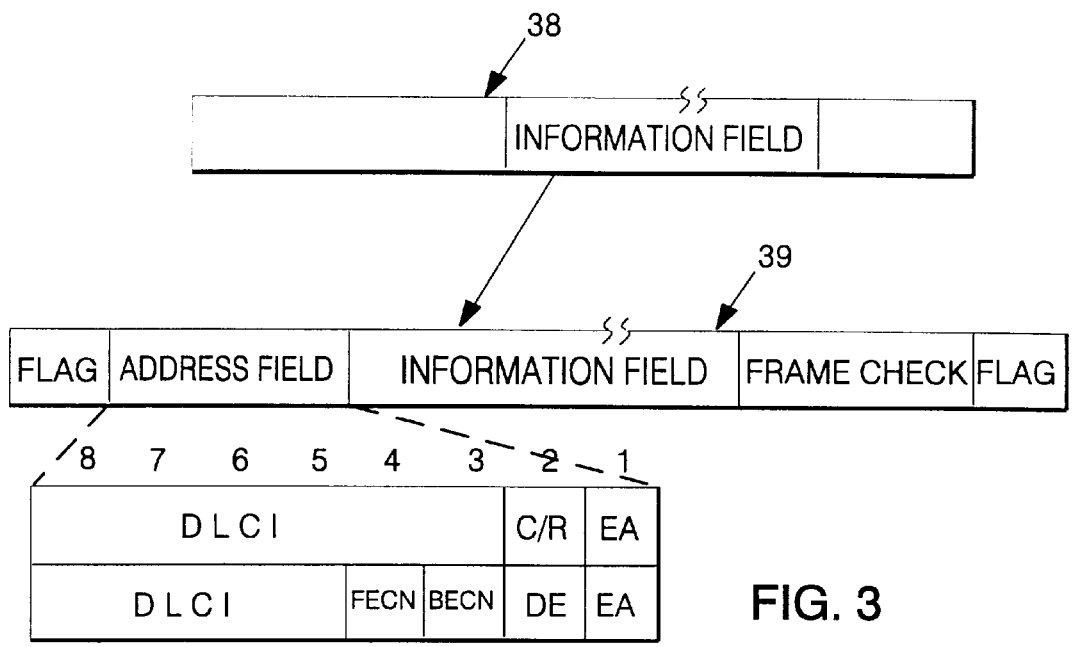
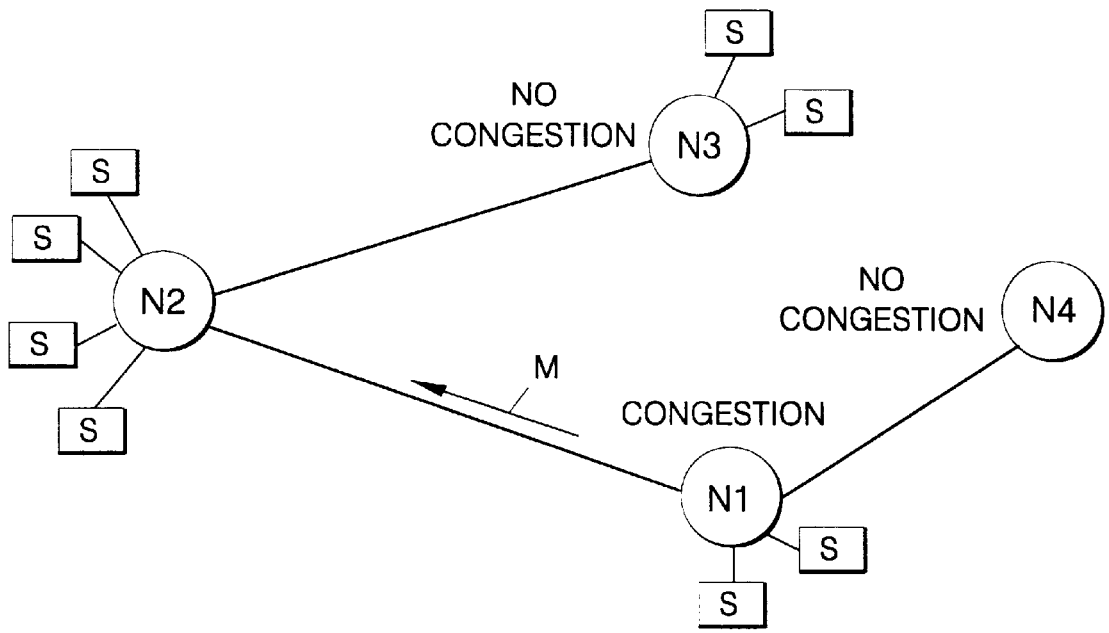
FIG. 4

CONTROL OF OVERLOAD SITUATIONS IN FRAME RELAY NETWORK

This application claims benefit of International application PCT/ FI94 /00535 filed Nov. 29, 1994.

BACKGROUND OF THE INVENTION

The invention relates to a method and a system for congestion management in a frame relay network.

Congestion means a situation in which the number of transmission requests exceeds the transmission capacity at a certain network point (called a bottle-neck resource) at a specific time. Congestion usually results in overload conditions, as a result of which the buffers overflow, for instance, and so packets will be retransmitted either by the network or the subscriber. The function of congestion management (CM) is to maintain a balance between the transmission requests and the transmission capacity so that the bottle-neck resources operate on an optimal level, and the subscribers are offered service in a way that assures fairness.

Congestion management can be divided into congestion avoidance (CA) and congestion recovery (CR). Congestion avoidance methods aim at preventing the occurrence of congestion in the network by dynamically adjusting the bandwidth of the subscribers in accordance with network congestion conditions and/or by altering the network routing so that part of the traffic load of the bottle-neck resources is shifted to idle resources. The purpose of recovery methods, in turn, is to restore the operation of the bottle-neck resources to an optimal level if the avoidance methods have failed to prevent the occurrence of congestion.

The frame relay (FR) technique is a packet-switched network technique used for the transmission of frames of varying length in place of the packet-switched network connections earlier placed in use. The protocol (X.25) applied generally in the present packet-switched networks requires plenty of processing and the transmission equipment is expensive, as a result of which the speeds also remain low. These matters are due to the fact that the X.25 standard was developed when the transmission connections used were still rather prone to transmission errors. The starting point of the frame relay technique was a considerably lower transmission line error probability. It has therefore been possible to discard a number of unnecessary functions in the frame relay technique, which makes the delivery of frames rapid and efficient. The Frame Mode Bearer Service is described generally in CCITT recommendation I.233 (Reference 1) and the associated protocol in recommendation Q.922 (Reference 2). Congestion in an FR network and congestion management mechanisms are described in CCITT recommendation I.370 (Reference 3). For a more detailed description of the FR technique, reference is made to *An Overview of Frame Relay Technology*, Datapro Management of Data Communications, McGraw-Hill Incorporated, April 1991, (Reference 4) as well as the above-mentioned recommendations.

In the FR network hierarchies presently in use, nodes have reception and transmission buffers corresponding only to the physical channels, i.e. the traffic of several different virtual channels and applications passes through the same buffer. Buffers are emptied as far as possible to links outbound from the node irrespective of the total level of congestion in the network. Links outbound from the node are thus loaded as much as possible even if the frame will probably be discarded closer to the middle of the network (at a congested node). In addition to wasting the network resources, discarding of frames at trunk nodes of the network affects the applications using the network in the form of longer throughput delays. (The virtual channel refers to a virtual connection portion having the length of one transmission link while the virtual connection is the actual packet-switched end-to-end FR connection.)

Even though the traffic received from virtual channels is monitored on subscriber connections on the basis of general service parameters Bc, Be and CIR, the monitoring is not effected when frames are forwarded from the subscriber node. (Parameter Bc (committed burst size) represents the maximum amount of data the subscriber can transmit over the network within a certain time slot Tc (usually Tc=1s); parameter Be (excess burst size) represents the amount of data by which the subscriber can exceed the value Bc within the time slot Tc; and parameter CIR (committed information rate) represents the data transmission rate guaranteed by the network under normal conditions, CIR=Bc/Tc. These parameters are defined in Reference 3.) From the reception buffer, the frame is routed to the correct channel-specific transmission buffer. Frames arriving at the node thus pass through the entire node on the FIFO principle. Due to the burstiness of the traffic in a frame relay network, it often follows from the above that one virtual channel takes a major part of the buffering and relay capacity of a node. This affects the other virtual channels supplying traffic to the node both as longer throughput delays and as higher frame loss probabilities. Even one virtual channel with a highly bursty or unsatisfactory nature may cause the other virtual channels of the connection to be subjected to a considerable fall in the service level.

SUMMARY OF THE INVENTION

The object of the present invention is to obviate the drawbacks described above and to provide a new type of congestion management method in an FR network to allow the network resources to be utilized more fairly and more efficiently than before.

The idea of the invention is to transmit congestion notifications from the network nodes to the subscriber node of the virtual channel whose frame is received at the node, and to control the amount of traffic supplied by each virtual channel from a subscriber node towards the network in virtual-channel-specific buffers of the subscriber node, for instance according to the total level of congestion in the network indicated by these congestion notifications.

The method of the invention allows the relay capacity of a single node and, above all, of the entire network to be equitably divided between all subscribers.

BRIEF DESCRIPTION OF THE DRAWINGS

In the following, the invention and its preferred embodiments will be described in greater detail with reference to the examples illustrated in the accompanying drawings, in which FIG. 3 illustrates the format of a frame to be delivered in an FR network, FIG. 4 illustrates the delivery of congestion notifications in the network.

DETAILED DESCRIPTION

A frame relay network can be used by several different applications, which do not require similar services. It is therefore advantageous to employ the method of the invention in a network where the services are divided into different classes according to the applications, taking into account the two most significant parameters (frame loss probability and delay). Such a solution is disclosed in Finnish Patent Application No. 925671. In this application, it is suggested that the services be divided into three classes as follows:

- the first service class (class 1) offers interactive service where the delay is kept short,
- the second service class (class 2) offers a low frame loss probability without the delay having any great significance, and
- the third service class (class 3) offers both a short delay and a low frame loss probability.

Each trunk connection of a network realized in this way has service-class-specific buffers, one for each service class. A subscriber node, in turn, has virtual-channel-specific buffers on the side of the subscriber connection. These solutions will be described more closely below; otherwise reference is made to the Finnish patent application cited above.

Figure 1:
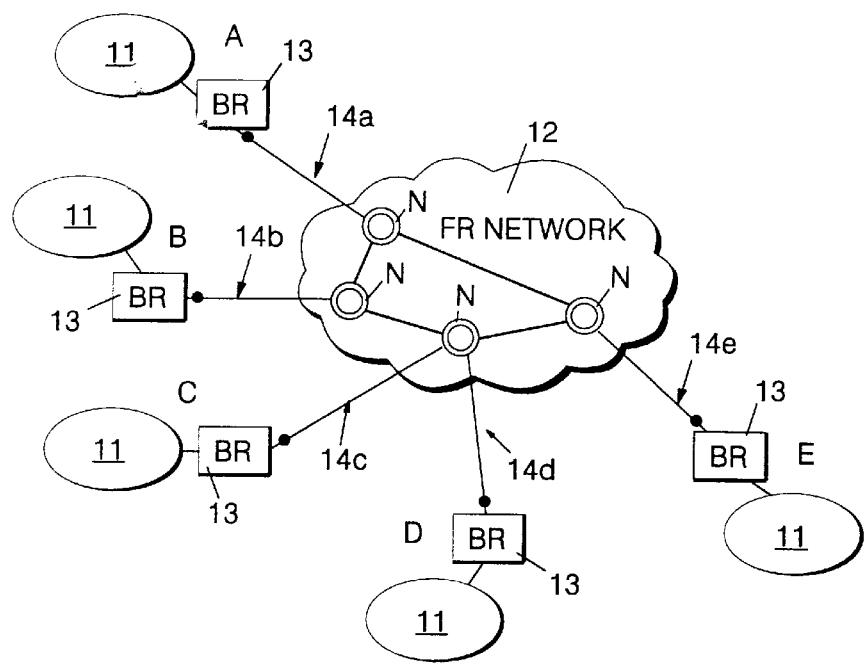
FIG. 1 illustrates a typical operating environment of the method according to the invention.

FIG. 1 shows an FR network offering public network services, that is, a frame relay network 12 interconnecting local area networks 11 of different offices A . . . E of a single corporation or a plurality of corporations. The local area network 11 of each office has access to the FR service via a local area network bridge 13 and a data link indicated with the references 14a . . . 14e, respectively. The connection between an FR subscriber A . . . E and an FR network node N is known per se, wherefore it will not be described more closely herein. More detailed information about local area networks and bridges used in their interconnection can be found, e.g. in an article by Michael Grimshaw *LAN Interconnections Technology*, Telecommunications, February 1991, and in Lähiverkko-opas, Leena Jaakonmäki, Suomen ATK-kustannus Oy, 1991, which are incorporated herein by reference.

Figure 2:
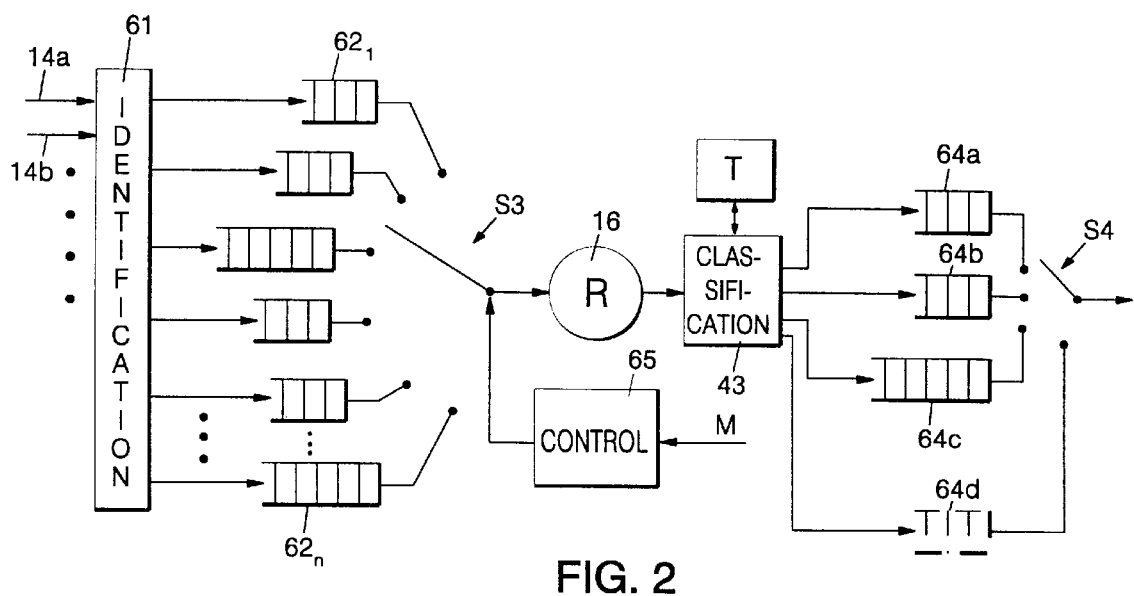
FIG. 2 illustrates an FR network subscriber node according to the invention.

A typical feature of the known node structure of the FR network is that the same buffer is used for all frames, assuming that they are routed to the same physical connection. According to the present invention, on the contrary, buffers corresponding to the above-described service classes are provided at the output boundary of all network nodes and at the input boundary having trunk connections. FIG. 2 illustrates this kind of solution at a trunk node in the network. The node receives FR frames originally assembled in the bridges 13 of the subscriber connections (FIG. 1). The frame of the subscriber LAN 11 is inserted into the information field of the FR frame in the bridge 13 (with the exception of timing bits and other similar bits). FIG. 3 illustrates the insertion of a LAN frame 38 into the information field of an FR frame 39. It also shows a typical FR network frame format where the address field preceding the information field comprises two octets (bits 1 to 8). The bits 3 to 8 of the first octet and the bits 5 to 8 of the second octet form a data link connection identifier DLCI, which indicates to the node e.g. the virtual connection and virtual channel to which a particular frame belongs. The virtual channels are distinguished from each other by means of the data link connection identifier. The data link connection identifier, however, is unambiguous only over a single virtual channel, and it may change in the node on transition to the next virtual channel. The bit 2 of the second address field octet, called a DE bit (Discard Eligibility Indicator), is also significant for the discarding of frames. In accordance with the CCITT recommendation, it is allowable to discard a frame, e.g. under congestion conditions if the DE bit of the frame has been set to one. As the other bits in the FR frame are not relevant to the present invention, they will not be described more closely herein. References 2 and 4 mentioned above are referred to for a more detailed description.

At a subscriber node on the periphery of the network (FIG. 2), the subscriber connections 14a, 14b, etc., (which in the example illustrated in FIG. 2 are connected to the same node) are connected at first to an identification unit 61, which receives FR frames formed in bridges 13 (FIG. 1). The identification unit 61 reads the data link connection identifier DLCI from the address field of the frame, and forwards the frame to an input buffer $62_1$ . . . $62_n$ corresponding to the virtual connection indicated by the identifier. Each data link has a specific selector S3 which selects frames from the input buffers of each virtual channel and forwards them to a centralized router 16, which routes the frames further to a classification unit 43 of the correct data link (the figure shows only one outbound data link). The classification unit 43 reads the identifier DLCI from the address field of the frame and selects from table T the service class corresponding to the virtual channel indicated by the identifier. On the basis of the classification it has completed, the classification unit 43 applies each frame to an output buffer 64a, 64b or 64c corresponding to the service class of the frame. Each outbound data link thus has three output buffers, one for each service class. The selector S4 reads the frames from these service-class-specific buffers further to the trunk connection.

Traffic transmitted by the subscribers over the FR network is thus buffered on the input side of the subscriber node specifically for each virtual connection. Incoming frames 39 are chained dynamically over each virtual connection. Depending on the service class of the virtual connection, the chain length has a predetermined allowable maximum value; this is smaller in service classes 1 and 3 and greater in service class 2. The selector S3 reads the buffers $62_1$ . . . $62_n$ e.g. in proportion to the amount of traffic allocated to them, whereby the fairness principle is met.

According to the invention, the amount of traffic supplied to the network 12 by each virtual channel is adjusted in the virtual-channel-specific buffers $62_1$ . . . $62_n$ so that the amount of traffic varies depending on the level of congestion in the network around a basic value sold to the channel in question. The total amount of traffic supplied to the inner parts of the network is thus based on the service level sold to the virtual channel, on bandwidth, and on the total level of congestion in the network; of these, the service level and the bandwidth determine a certain basic value, around which the amount of traffic is adjusted according to what the total level of congestion is in the network. The adjustment is performed by transmitting congestion notifications from the network to the subscriber node of the virtual channel whose frame was received; the amount of traffic supplied towards the network from the subscriber node buffer corresponding to this virtual channel within a given time interval of a predetermined length is controlled according to the contents of the congestion notifications received from the network during this interval. The congestion notifications, indicated in FIG. 2 by reference M, are connected to the control unit 65 controlling the selector S3 in the subscriber node, said control unit controlling the amount of data read from each virtual-channel-specific buffer according to the contents of the congestion notifications. Each buffer is thus emptied on the basis of its own parameters and its own congestion notifications.

As regards the subscriber node, the method of the invention can be compared to a floodgate: the traffic which each virtual-channel-specific buffer allows to be transmitted to the network is controlled (by means of the control unit 65) by a system which functions as a floodgate, restricting the amount of data read from the buffer, i.e. adjusting the bandwidth of the virtual channel.

This floodgate is a system which is bound to the service parameter Bc described above, and which allows only a certain amount of data to be transmitted from a virtual-channel-specific buffer towards the network at a certain period of time. As to the resolution of monitoring the bandwidth of the virtual channel, it is possible to use a time interval having the length of, e.g., Tc/3 (Tc has often the length of 1s). During each interval having the length of Tc/3, the buffer is emptied to an outbound connection towards the network by an amount allowed by the height of the floodgate. The rest of the frames are left in the buffer to wait for the next interval of Tc/3.

According to the invention, the nodes of the network transmit the above-mentioned congestion notifications M in a backward direction to the subscriber nodes. These congestion notifications indicate the fill rate of the buffers at the node in question. This mechanism is illustrated in FIG. 4. The nodes of the network are indicated by references N1 ... N4, and the subscribers by references S. When a service-class-specific buffer at a network node, e.g. at node N1 in FIG. 2, exceeds a certain fill rate, e.g. 20%, the node transmits a congestion notification in a backward direction to the subscriber node (N2 in FIG. 4) of the virtual channel whose frame was received. The node (N1) identifies the correct virtual channel as described above by means of the data link connection identifier DLCI.

The height of the floodgate determining the emptying rate of each virtual-channel-specific buffer at the subscriber node (i.e. the bandwidth offered to the virtual channel) is adjusted according to the contents of the congestion notifications received from the network on said virtual channel in such a way that a higher load corresponds to a smaller bandwidth. Adjustment of the bandwidth during the interval Tc/3 is preferably performed according to the most severe congestion notification received during the respective interval. If the virtual channel does not receive any congestion notification during the interval Tc/3, the bandwidth of the channel is automatically increased according to the invention at the beginning of the following interval. The increase can be determined to be, e.g., 10%. The initial value for the bandwidth is the value Bc+Be sold to the channel, i.e. the maximum which the amount of traffic is not allowed to exceed under any circumstances.

By congestion notifications it is possible to indicate, for example, three different levels of congestion, whereby the changes in bandwidth corresponding to them (which are all calculated on the basis of the maximum value) may be, for instance, similar to those indicated in the following table.

| Degree of severity of congestion notification | Change in bandwidth |
| --- | --- |
| 1 | −10% |
| 2 | −15% |
| 3 | −20% |

Figure 5A:
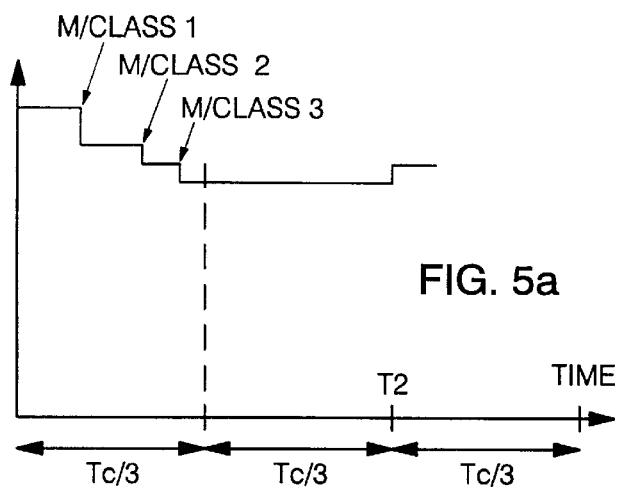
FIG. 5a illustrates the changing of bandwidth according to congestion notifications in a first exemplary case.

To illustrate the principles described above, FIGS. 5a and 5b show two different examples of adjustment according to the invention. The vertical axis represents the height of the floodgate (i.e. bandwidth), whereas the horizontal axis represents time consisting of successive intervals having the length of Tc/3. In the case illustrated in FIG. 5a, a congestion notification M with severity degree 1 is at first received, wherefore the bandwidth is reduced immediately. After that a second congestion notification M with severity degree 2 is received, wherefore the bandwidth is again reduced immediately. The last, third notification M received during the interval Tc/3 has the degree of severity 3, wherefore the bandwidth is again reduced immediately (having then the lowest possible value). As no congestion notifications are received during the following interval Tc/3, the bandwidth of the channel grows automatically (instant T2) after this interval (at the beginning of the following interval Tc/3).

Figure 5B:
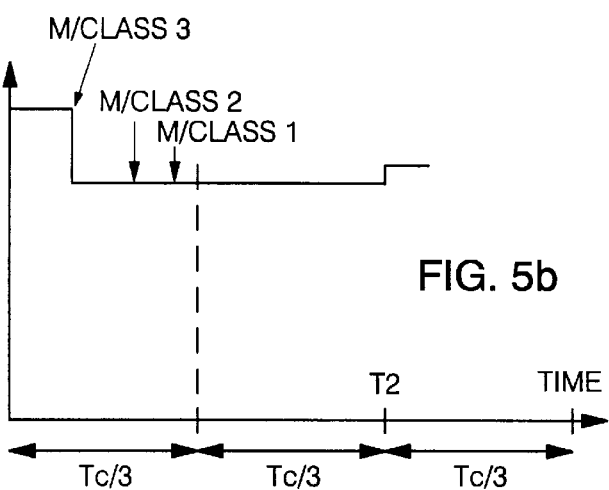
FIG. 5b illustrates the changing of bandwidth according to congestion notifications in a second exemplary case.
Figure 6:
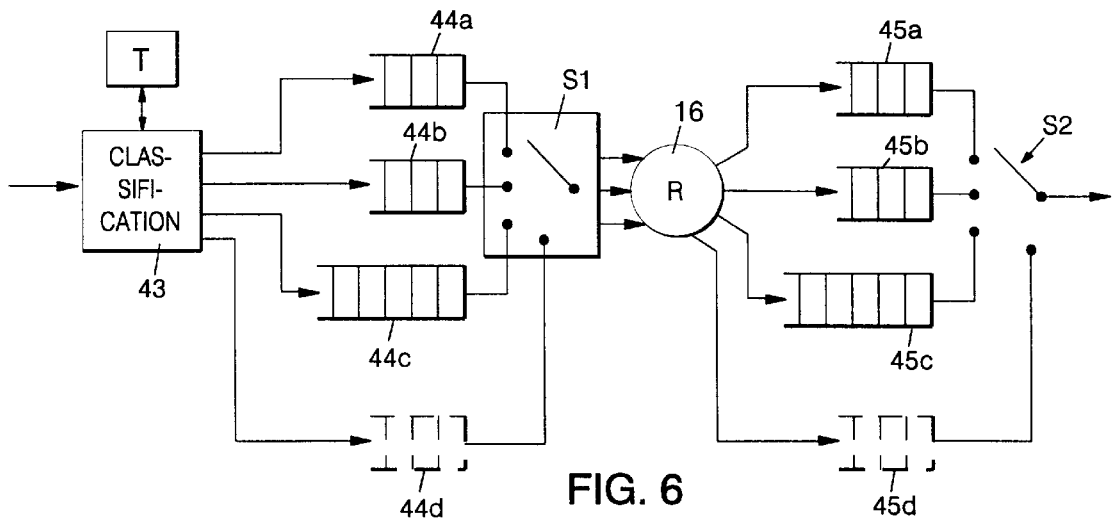
FIG. 6 illustrates an FR network trunk node according to the invention.

In the case illustrated in FIG. 5b, the order of the congestion notifications in time domain is reverse. At first a congestion notification with severity degree 3 is received, wherefore the bandwidth is reduced immediately to the lowest possible value. The other congestion notifications received during the interval do not change the bandwidth further, no matter what their degree of severity is. If a congestion notification with severity degree 2 were received at first, only a congestion notification with severity degree 3 would cause the bandwidth to be further reduced.

According to the invention, the bandwidth is thus reduced immediately upon reception of a congestion notification which is the most severe received so far during the interval in question, but the bandwidth can grow only if no congestion notifications are received during the interval Tc/3. In this case, the growth takes place after the interval in question has ended.

If the bandwidth has exceeded the value Bc, it drops according to a preferred embodiment of the invention to the value Bc immediately on reception of the first congestion notification, wherefore the abovedescribed limits set for the changes are not followed in this special case. This ensures rapid reaction above all to instantaneous congestion. In all cases, however, the bandwidth is adjusted upwards as described above.

Each degree of severity of a congestion notification, bound to the fill rate of the buffers located at the network nodes, can be set to correspond e.g. to the fill rate limits given in the following table:

| Fill rate calculated on total buffer capacity | Degree of severity of congestion |
| --- | --- |
| 20 ... 39% | 1 |
| 40 ... 59% | 2 |
| 60 ... 100% | 3 |

Each node of the network monitors the fill rates of the service-class-specific buffers continuously. When a new frame is received at a congested node, the node transmits a congestion notification M in the direction from which the frame was received, to the subscriber node of the virtual channel in question. If the fill rate of the buffer is less than 20%, an incoming frame does not lead to the transmission of a congestion notification. Simultaneously with the transmission of a congestion notification, an interval T1 of a predetermined length is set by a timer at the node; during this interval, no new congestion notifications are transmitted to the virtual channel in question. The length of the interval T1 may be, for example, 100 ms (i.e. about one third of the interval Tc/3). In this way it is ensured that several congestion notifications are not transmitted in vain upon one burst occurring on the virtual channel. When the timer has timed off, it is again possible, if necessary, to transmit a congestion notification to the virtual channel.

Congestion notifications M should be delivered to egress nodes extremely fast to enable rapid reaction to congestion. According to a preferred embodiment of the invention, these congestion notifications form a separate, fourth service class, for which separate service-class-specific buffers are provided at the nodes. As regards the subscriber node, this means that the output side of the node is provided with a fourth output buffer, indicated in FIG. 2 by broken lines and the reference 64d.

As regards the trunk node of the network, this embodiment is shown in FIG. 5, in which the buffers 44d and 45d corresponding to the service class of congestion notifications are indicated by broken lines. At the trunk node, an FR frame 39 of the format described above is connected at first to a classification unit 43 specific for each data link. The classification unit 43 reads the data link connection identifier from the address field of the frame, and selects the service class corresponding to the virtual channel indicated by the identifier. The virtual channels and the respective service classes are stored in a table T. On the basis of the classification it has completed, the classification unit 43 applies each frame to an input buffer corresponding to the service class of the frame. Each inbound data link has thus four input buffers, one for each service class 1 to 3 and one for congestion notifications. Each data link has a specific selector S1 which selects the frames from the service-class-specific buffers and forwards them within the node. On the output side of the trunk node, the frames are connected to an interface corresponding to their own data link. At this interface they are supplied in accordance with the service class selected on the input side of the node to one of the service-class-specific output buffers, from which the selector S2 reads the frames further to the trunk connection. Each outbound data link has thus four output buffers, one for each service class 1 to 3 and one for congestion notifications. Alternatively, classification units may be provided separately for each data link even on the output side of the node, in which case classification data need not be transferred within the node.

The above-described traffic control allows the relay capacity of a single node and, above all, of the entire network to be equitably divided between the different subscribers. In the event of instantaneous congestion, caused by burstiness of the traffic, the method of the invention allows the traffic to be efficiently controlled by buffering the additional traffic transmitted by the channel that sent the burst. Thus the channels operating within the limits of committed traffic still get their traffic through the network with a short delay. The traffic on each virtual channel thus varies around the value Bc.

In the event of continuous congestion, the procedure is otherwise similar but the traffic exceeding the relay capacity of the network must be discarded when there is overflow in the virtual-channel-specific buffers. Even in such a case, the discarding of traffic affects the virtual channels which overload the network; the traffic of the other channels hardly needs to be slowed down at all. For discarding frames, it is advantageous to use the method disclosed in co-pending Finnish Patent Application No. 935364 (now Finnish patent 94814, corresponding to U.S. patent application Ser. No. 08/647, 950, filed Sep. 24, 1996 now pending), according to which the entire contents of a buffer are discarded when a frame is received in a buffer which is full. For a more detailed description of this method, reference is made to the above-mentioned co-pending patent application.

If there is idle relay capacity in the network, no congestion notifications are transmitted, whereby the channel bandwidths may grow to the maximum value Bc+Be set for them. In this case, both the committed traffic and the excess traffic are read from the buffers to the inner parts of the network. The capacity of the network will thus be utilized even in quiet times, and additional traffic will be treated correctly.

Although the invention has been described above with reference to the examples shown in the accompanying drawings, it will be obvious that the invention is not restricted to these examples, but can be modified within the scope of the inventive concept disclosed above and in the appended claims. In its details, the internal structure of the nodes, for example, may vary in many ways, even though the adjustment based on congestion notifications is performed according to the idea of the invention. During the interval Tc/3, for example, each virtual-channel-specific buffer can be read by the selector S3 either only once or several times. The degree of severity of congestion notifications can also be bound to any resource whose congestion level is monitored continuously. In this case, it is possible to employ, for instance, the method disclosed in Finnish Patent Application No. 925670, according to which a congestion level is determined for a resource of the network, the value of the congestion level having a certain relationship with the values of the service levels.

We claim:

1. A method for congestion management in a frame relay network having a plurality of nodes between which data is transmitted, at least part of said nodes being subscriber nodes to which respective subscribers are connected over respective data links on respective virtual channels, said method comprising:

determining which of said virtual channels is associated with each frame to be transmitted, when the respective frame is received at a node, and transmitting congestion notifications from respective ones of said nodes in a backward direction towards subscriber nodes to which respective subscribers are connected, buffering data received from respective ones of said subscribers at a respective input boundary of each respective subscriber node, to respective virtual-channel-specific buffers, said transmitting including transmitting respective ones of said congestion notifications each from a respective node to the respective said subscriber node of the respective said virtual channel a frame associated with which is received at that particular moment at the respective said node, and controlling the amount of traffic supplied towards the network from each respective said subscriber node buffer corresponding to each respective said virtual channel during a respective certain interval having a predetermined length on the basis of the contents of respective ones of said congestion notifications received from the network during each respective said interval, whereby traffic from respective ones of said subscribers to respective ones of said buffers is discarded, when necessary for managing congestion.

2. The method according to claim 1, further comprising:

binding the degree of severity of congestion notifications to the fill rate of respective ones of said buffers at a respective said node, whereby a certain severity degree corresponds to each fill rate range, and a change of constant magnitude in the amount of traffic supplied towards the network during a respective said interval corresponds to a certain severity degree of congestion.

3. The method according to claim 1, wherein:

if no congestion notifications belonging to a respective said virtual channel are transmitted during a respective said interval, increasing the amount of traffic at a respective said subscriber node by a certain constant value, without exceeding an allowed maximum value.

4. The method according to claim 3, wherein:

when a respective said amount of traffic exceeds a respective committed burst size, reducing the respective amount of traffic to a value corresponding to the respective committed burst size immediately upon reception of a respective said congestion notification.

5. The method according to claim 1, wherein:

said controlling includes controlling the respective said amount of traffic according to the most severe respective congestion notification received during a respective said interval.

6. The method according to claim 1, further including:

after the transmission a respective said congestion notification to a given said virtual channel, preventing transmission of a following congestion notification to the same given virtual channel for a predetermined time, in order to prevent several congestion notifications from being sent in vain upon one burst occurring on the respective given virtual channel.

7. A system for congestion management in a frame relay networks comprising:

a plurality of nodes arranged for transmission of data therebetween, at least part of said nodes being subscriber nodes to which respective subscribers of the network are connected over respective data links on respective virtual channels, the nodes comprising means for transmitting congestion notifications in a backward direction towards respective ones of the subscribers, virtual-channel-specific buffers to which subscriber-generated data is buffered are provided at an input boundary of each subscriber node, and each subscriber node comprises means for controlling the amount of subscriber-generated traffic supplied towards the network from a virtual-channel-specific buffer during a certain interval having a predetermined length, said controlling means being responsive to the contents of congestion notifications received from the network at the respective said subscriber node during said certain interval.

* * * * *